Oct. 11, 1960    R. A. FINDLAY    2,955,910
PROCESS FOR REMOVING CARBON DIOXIDE FROM AMMONIA
Filed April 7, 1958
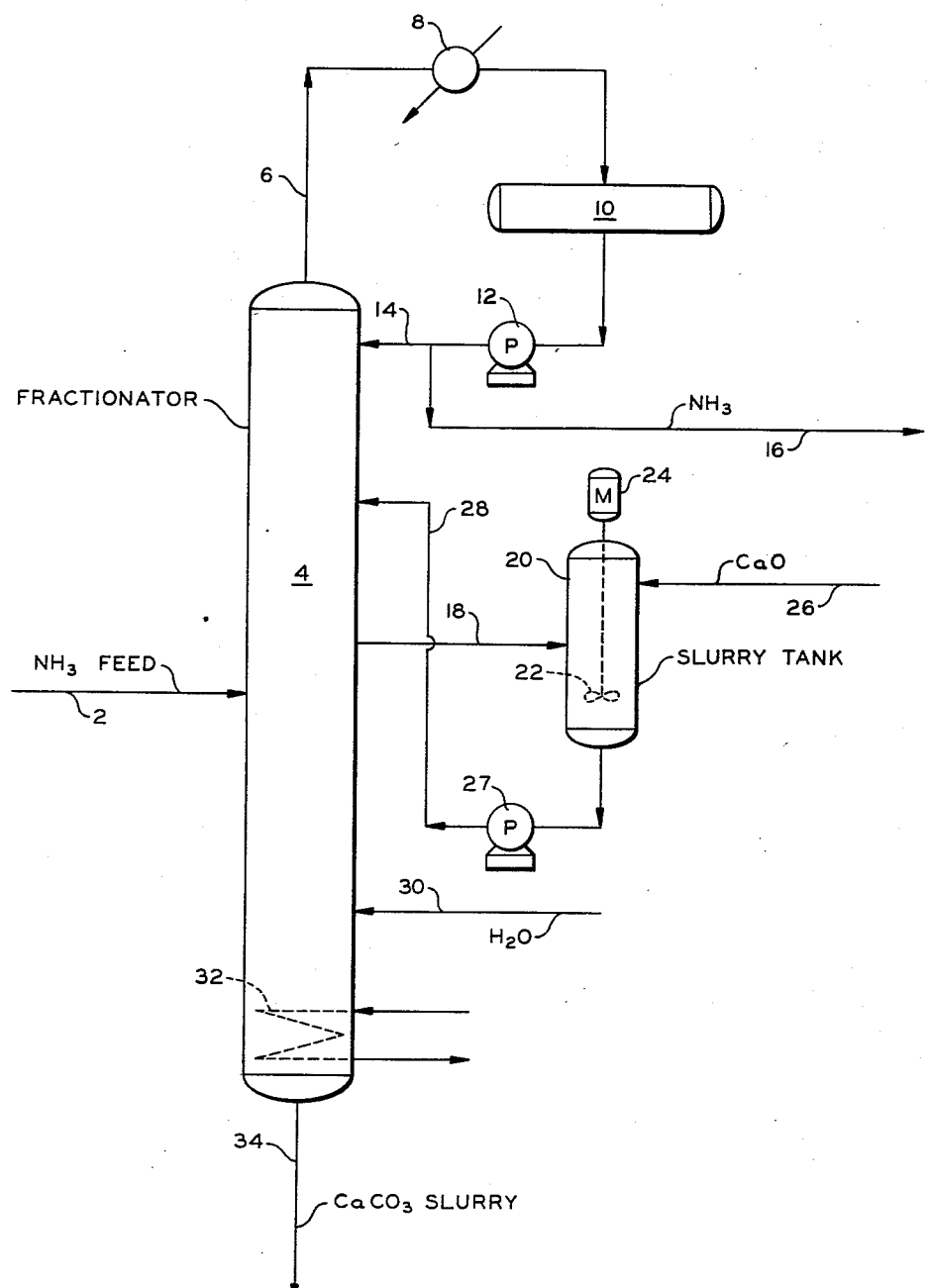
INVENTOR.
R. A. FINDLAY
BY *Hudson and Young*
ATTORNEYS

United States Patent Office 2,955,910
Patented Oct. 11, 1960

2,955,910

PROCESS FOR REMOVING CARBON DIOXIDE FROM AMMONIA

Robert A. Findlay, Bartlesville, Okla., assignor to Phillips Petroleum Company, a corporation of Delaware Filed Apr. 7, 1958, Ser. No. 726,805

7 Claims. (Cl. 23—2)

This invention relates to the purification of ammonia. In one aspect it relates to the removal of carbon dioxide from ammonia by treating said ammonia with a metal oxide or hydroxide.

Gases containing hydrogen and nitrogen, suitable for the synthesis of ammonia, are obtained by reforming hydrocarbons with steam and air. Product gas obtained by this process contains not only hydrogen and nitrogen but also carbon dioxide and carbon monoxide. Before converting the synthesis gas to ammonia it is customary to remove the carbon oxides, for example, by treating the gas successively with monoethanolamine and copper ammonium salt solution. These treatments are effective in removing the major portion of the carbon oxides; however a small amount of carbon dioxide often remains in the synthesis gas and is present in the ammonia product from the ammonia synthesis reaction. When the ammonia is used, for example, as a refrigerant, it can become contaminated with water whereby ammonium carbonate is formed, with resultant fouling and plugging of refrigeration equipment.

It is an object of this invention to provide an improved process for the purification of ammonia.

Another object of the invention is to provide an improved process for removing carbon dioxide from ammonia.

Still another object of the invention is to provide an improved process for reducing fouling of equipment when utilizing ammonia process streams.

These and other objects of the invention will become more readily apparent from the following detailed description and discussion.

The foregoing objects are realized broadly by contacting ammonia, containing carbon dioxide, with a compound selected from the group consisting of metal oxides and metal hydroxides and separating the ammonia and resulting metal carbonate.

In one aspect of the invention the resulting carbonate is separated from the ammonia by washing with a liquid, such as water, which is higher boiling than the ammonia.

The method of this invention is applicable generally to the treatment of ammonia streams containing carbon dioxide. The ammonia can be anhydrous (commercially containing not more than about 150 parts per million of water) or can contain substantial quantities of water. The amount of carbon dioxide present can vary over a wide range; however, as previously pointed out, the ammonia synthesis gas is usually pretreated to remove carbon dioxide and thus only residual quantities of this material are present in the product from the ammonia synthesis. Usually the amount of carbon dioxide present in the ammonia stream to be treated is between about 50 p.p.m. and about 2000 p.p.m. However, lesser or larger quantities of this material can be present in the ammonia.

The compounds which are used in treating the ammonia are metal oxides and metal hydroxides which react with carbon dioxide to form carbonates. These include generally oxides and hydroxides of the metals of the various groups of the periodic table, however, from a practical viewpoint it is usually preferred that compounds of the more reactive metals be used. The most reactive metals are the alkali metals and the alkaline earth metals. Compounds of metals of either of the latter groups can be employed; however, compounds from the two groups provide different results in that the carbonates of the alkali metals are soluble in water, whereas the carbonates of the alkaline earth metals are substantially insoluble. Specific compounds which can be employed are the oxides and hydroxides of metals such as sodium, potassium, calcium, magnesium, barium, etc. If it is desired to convert the carbon dioxide to the water soluble carbonate, sodium and potassium oxides or hydroxides are preferred and if the insoluble carbonate is desired the oxides or hydroxides of calcium, magnesium or barium are preferred.

The treating operation preferably is carried out in a tray or baffle type contacting tower with ammonia, containing carbon dioxide, being passed countercurrently to a slurry of the metal oxide or hydroxide in ammonia. Purified ammonia is removed overhead from the contactor as a vapor and metal carbonate is removed from the bottom of the tower. To aid in removal of the carbonate the tower bottom can be washed with a material which is higher boiling than the ammonia. Usually water is preferred for this purpose because of its low cost and also because of its ability to dissolve and readily effect removal of carbonate from the contacting tower when an alkali metal oxide or hydroxide is employed. The metal oxide or hydroxide is usually introduced to the contacting tower as a slurry in ammonia, with the ammonia being obtained as a side-stream from the tower or from the purified overhead product. The quantity of metal oxide employed is at least the stoichiometric amount required to convert the carbon dioxide contained in the ammonia to the metal carbonate and preferably between about 2 and about 4 stoichiometric amounts of a metal oxide or hydroxide.

When the metal or metal oxide used in the treating operation forms an insoluble carbonate it is desirable that the process be carried out in a contacting tower which is suitable for handling solids. Thus, a perforated tray or baffle type tower is usually preferred. If, on the other hand, an alkali metal oxide or hydroxide is employed in the treating operation whereby a carbonate soluble in water is formed, the treating operation can be carried out in any conventional contacting tower. The amount of water which is used to slurry or dissolve the carbonate and aid in its removal from the contacting tower can vary over a wide range; however, usually it is desirable to employ sufficient water to provide between about three gallons and about five gallons of water per pound of carbonate. The treating operation is normally carried out at temperatures approaching the boiling point of the slurry material, the pressure in the fractionating tower being regulated to permit vaporization of ammonia but not of the slurry material, such as water, introduced to the bottom of the tower. While lower temperatures can be used, the solubility of ammonia in the slurry material, such as water, decreases with increasing temperature, therefore, more elevated temperatures are preferred for maximum ammonia recovery. More usually the process is carried out in a pressure range of between about 140 and about 150 p.s.i.g.

In order to more clearly describe the invention and provide a better understanding thereof, reference is had to the accompanying drawing which is a diagrammatic illustration of a fractionator and associated equipment suitable for carrying out one embodiment of the invention. Referring to the drawing, ammonia containing carbon dioxide is introduced through conduit 2 to fractionator 4. Tower 4 is a conventional fractionating vessel containing perforated trays and having a reboiler 32 in the lower portion thereof. Within the fractionator the ammonia is contacted countercurrently with a slurry of calcium oxide in ammonia. The slurry is provided by mixing calcium oxide and ammonia in a slurry tank 20, the calcium oxide being introduced through conduit 26 and the ammonia being withdrawn from the fractionator and introduced through conduit 18. In the slurry tank the ammonia and calcium oxide are mixed by a mixer 22 driven by motor 24 to form a substantially uniform slurry. The slurry is withdrawn from tank 20 through pump 27 and introduced to the upper portion of the fractionator through conduit 28. Vaporization of ammonia in the fractionator is provided by heat introduced through reboiler 32 and ammonia vapors, substantially free of carbon dioxide pass overhead from the fractionator through conduit 6. The vapors are condensed in condenser 8 and enter accumulator 10. The ammonia product is widthdrawn through pump 12 and divided, with a portion being returned to the fractionator as reflux through conduit 14, and the remainder being yielded from the unit as product through conduit 16.

Upon entering the fractionating tower the calcium oxide contacts the ammonia feed and reacts with the carbon dioxide present therein to form insoluble calcium carbonate. The solid calcium carbonate passes downwardly through the tower, is entrained in water introduced to the lower portion of the tower through conduit 30 and washed from the tower through conduit 34 as a slurry.

The preceding discussion has been directed to a preferred embodiment of the invention; however, this is not intended in any limiting sense and it is within the scope of the invention to utilize other apparatus and processing arrangements for carrying out the ammonia treating process. Thus, it is within the scope of the invention to employ alkaline earth oxides other than calcium oxide. Also, alkali metal oxides or hydroxides can be employed when it is desired to remove the calcium carbonate from the bottom of the fractionator as a solution rather than as a slurry. Again, it is within the scope of the invention to use a slurry material other than water to wash the bottom of the fractionator and remove insoluble carbonate therefrom.

The following data are presented in illustration of a specific embodiment of the invention.

EXAMPLE

*Flows*

| | Lb./Hr. |
|---|---|
| Ammonia feed (2) | 3700 |
| Composition: | |
| Ammonia_____wt. percent__ | 99.9 |
| Carbon dioxide_____do____ | 001. |
| Calcium oxide-ammonia slurry (18) | 380 |
| Composition: | |
| Ammonia_____wt. percent__ | 97.5 |
| Calcium oxide_____do____ | 2.5 |
| Calcium carbonate slurry (34) | 215 |
| Composition: | |
| Calcium carbonate____wt. percent__ | 3.9 |
| Water_____do____ | 94.0 |
| CaO_____do____ | 2.1 |

*Temperatures*

| Fractionator: | °F. |
|---|---|
| Top | 70 |
| Bottom | 366 |

*Pressures*

| | P.s.i.g. |
|---|---|
| Fractionator | 150 |
| Slurry tank | 160 |

Having thus described the invention by providing a specific example thereof, it is to be understood that no undue limitations or restrictions are to be drawn by reason thereof and that many variations and modifications are within the scope of the invention.

I claim:

1. A process for the separation of carbon dioxide from ammonia which comprises contacting ammonia containing carbon dioxide in a fractionation zone with a compound selected from the group consisting of metal oxides and metal hydroxides of alkaline earth metals whereby the insoluble carbonate of said metal is formed, recovering purified ammonia as overhead product, washing the bottom of the fractionation zone with a wash liquid higher boiling than ammonia and removing metal carbonate slurried in said liquid as bottom from the fractionation zone.

2. A process for the separation of carbon dioxide from ammonia which comprises contacting ammonia containing carbon dioxide in a fractionation zone with a slurry in ammonia of a compound selected from the group consisting of metal oxides and metal hydroxides of alkaline earth metals whereby the insoluble carbonate of said metal is formed, recovering purified ammonia as overhead product, washing the bottom of the fractionation zone with water and recovering metal carbonate slurried in water as bottoms from said zone.

3. The process of claim 2 in which said compound is calcium oxide.

4. The process of claim 2 in which said compound is magnesium oxide.

5. The process of claim 2 in which said compound is barium oxide.

6. The process of claim 2 in which said compound is calcium hydroxide.

7. The process of claim 2 in which said compound is magnesium hydroxide.

References Cited in the file of this patent

UNITED STATES PATENTS

| 1,290,244 | Kramers | Jan. 7, 1919 |
| 2,785,045 | Shen Wu Wan et al. | Mar. 12, 1957 |